United States Patent [19]

Ohshima et al.

[11] Patent Number: 4,644,514

[45] Date of Patent: Feb. 17, 1987

[54] HEAD DRIVE CONTROL APPARATUS

[75] Inventors: Ken Ohshima; Hiroo Okada; Masaharu Sakamoto, all of Tokyo, Japan

[73] Assignee: Olympus Optical Co., Ltd., Tokyo, Japan

[21] Appl. No.: 609,849

[22] Filed: May 14, 1984

[30] Foreign Application Priority Data

May 12, 1983 [JP] Japan ................................. 58-83206

[51] Int. Cl.$^4$ .............................................. G11B 21/02
[52] U.S. Cl. ........................................ 369/32; 369/33; 369/43; 369/57; 369/52
[58] Field of Search ........................ 369/32, 43, 53, 54, 369/57, 58, 50, 52, 56, 33; 358/342; 318/561, 592, 594; 360/78, 105–109

[56] References Cited

U.S. PATENT DOCUMENTS

| | | | |
|---|---|---|---|
| 3,721,882 | 3/1973 | Helms | 360/77 |
| 4,355,273 | 10/1982 | Du Vall | 318/594 X |
| 4,481,613 | 11/1984 | Yokota | 369/32 X |
| 4,513,406 | 4/1985 | Ishihara | 369/32 |
| 4,532,621 | 7/1985 | Nakagawa | 369/124 X |

FOREIGN PATENT DOCUMENTS 2229766 4/1974 Fed. Rep. of Germany .

Primary Examiner—Robert L. Richardson
Attorney, Agent, or Firm—Frishauf, Holtz, Goodman & Woodward

[57] ABSTRACT

A head drive control apparatus has a head and a scale reader. When the head is moved by a head drive mechanism, the scale reader detects the marks on a scale and converts them into a scale signal. In a speed control mode, the scale signal is compared with a target signal by an access signal generator, which produces an access signal representing the difference between the compared signals. The head is moved in accordance with the access signal until the scale signal becomes identical with the target signal. When these signals become equal, the speed control mode is switched to a position control mode. In the position control mode, a scale signal generator, a pulse generator, an up/down counter, a D/A converter, an adder and an interpolator convert the scale signal into an analog signal which represents the position of the head. The analog signal is compared with a position designating signal by a differential amplifier. The head is moved in accordance with the output signal of this amplifier.

6 Claims, 8 Drawing Figures

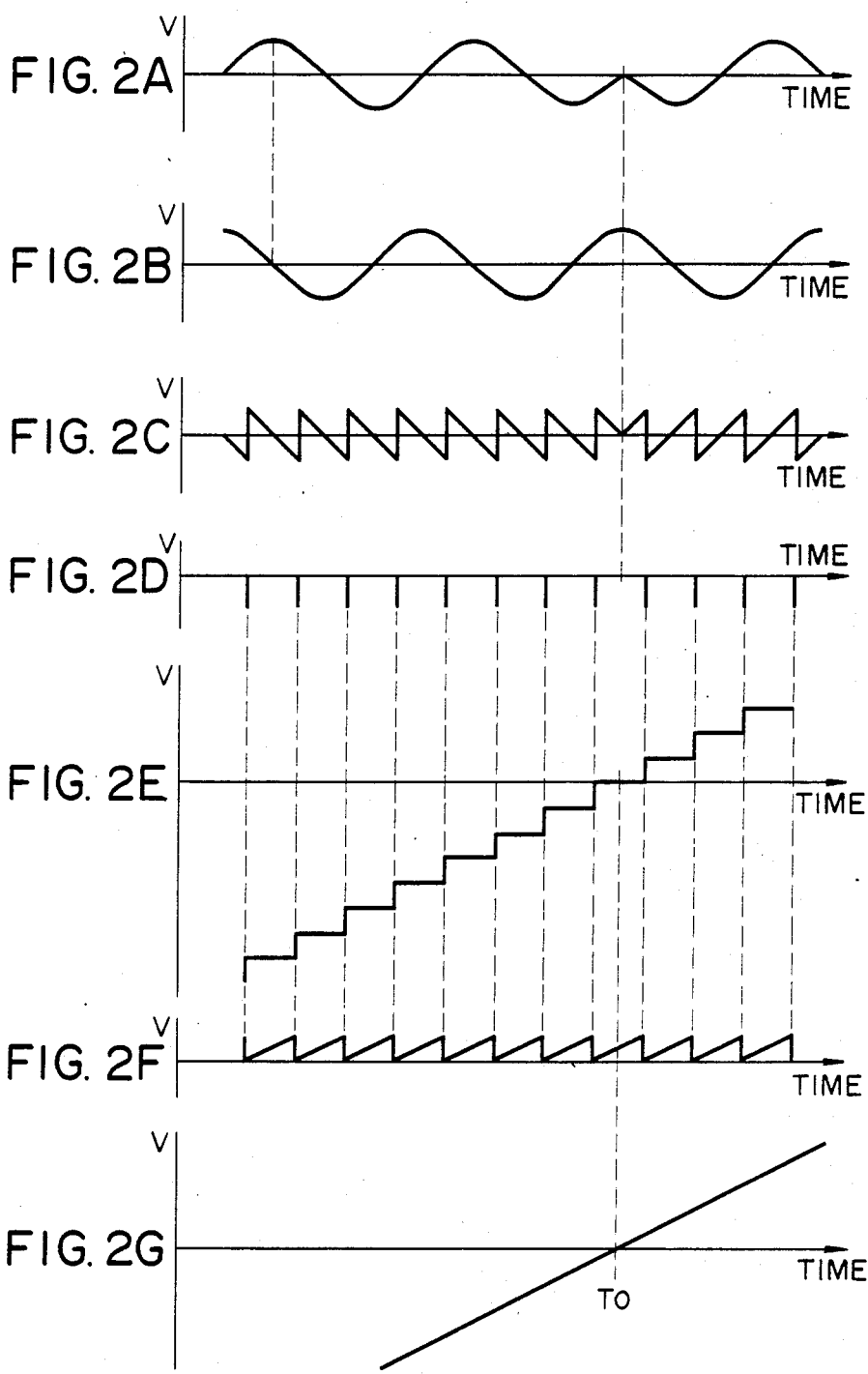

HEAD DRIVE CONTROL APPARATUS

BACKGROUND OF THE INVENTION

The present invention relates to a head drive control apparatus used in a recording/reproducing system for recording/reproducing image information with respect to a disk-shaped recording medium, for example, an optical disk or magnetic disk.

A conventional head drive control apparatus is proposed wherein a head is moved by a driver such as a voice coil motor along a radial direction of a disk, and a mark on a scale provided on a head drive mechanism is read to detect the head position, thereby controlling the head position. In this apparatus, the voice coil motor is driven in a speed control mode until the head reaches a target position. When the head has reached the target position, the voice coil motor is driven in a position control mode. In this mode, the head position is controlled between two adjacent marks on the scale. Therefore, in order to perform servo control of the head position with high precision, the pitch of the marks on the scale must be decreased. However, when the pitch is decreased, the servo range becomes narrowed, resulting in inconvenience.

SUMMARY OF THE INVENTION

It is an object of the present invention to provide a head drive control apparatus capable of widening a servo range without degrading the precision of movement of the head.

According to the invention, there is provided a head drive control apparatus comprising: a head for recording/reproducing data with respect to a disk-shaped recording medium; a head drive mechanism, for moving said head along a radial direction of said recording medium; scale signal detecting means for producing a scale signal by reading marks on a scale of a predetermined pitch provided on said head drive mechanism, the scale signal representing a position of said head moved by said head drive mechanism; speed controlling means for comparing the scale signal generated from said scale signal detecting means with a target signal and for driving said head drive mechanism to perform speed control of said head until a difference between the scale signal and the target signal becomes zero; and position controlling means for driving said head drive mechanism to control the position of said head to which a position designation signal is supplied, said position controlling means comprising analog signal generating means for processing the scale signal to generate an analog signal corresponding to a moved position of said head, and comparing means for comparing the analog signal generated from said analog signal generating means with the position designation signal to generate a difference signal, said head being driven by the head drive mechanism in accordance with the difference signal generated from said comparing means.

BRIEF DESCRIPTION OF THE DRAWINGS

FIGS. 2A to 2G are timing charts for explaining the operation of the device shown in FIG. 1.

DETAILED DESCRIPTION OF THE PREFERRED EMBODIMENT

Figure 1:
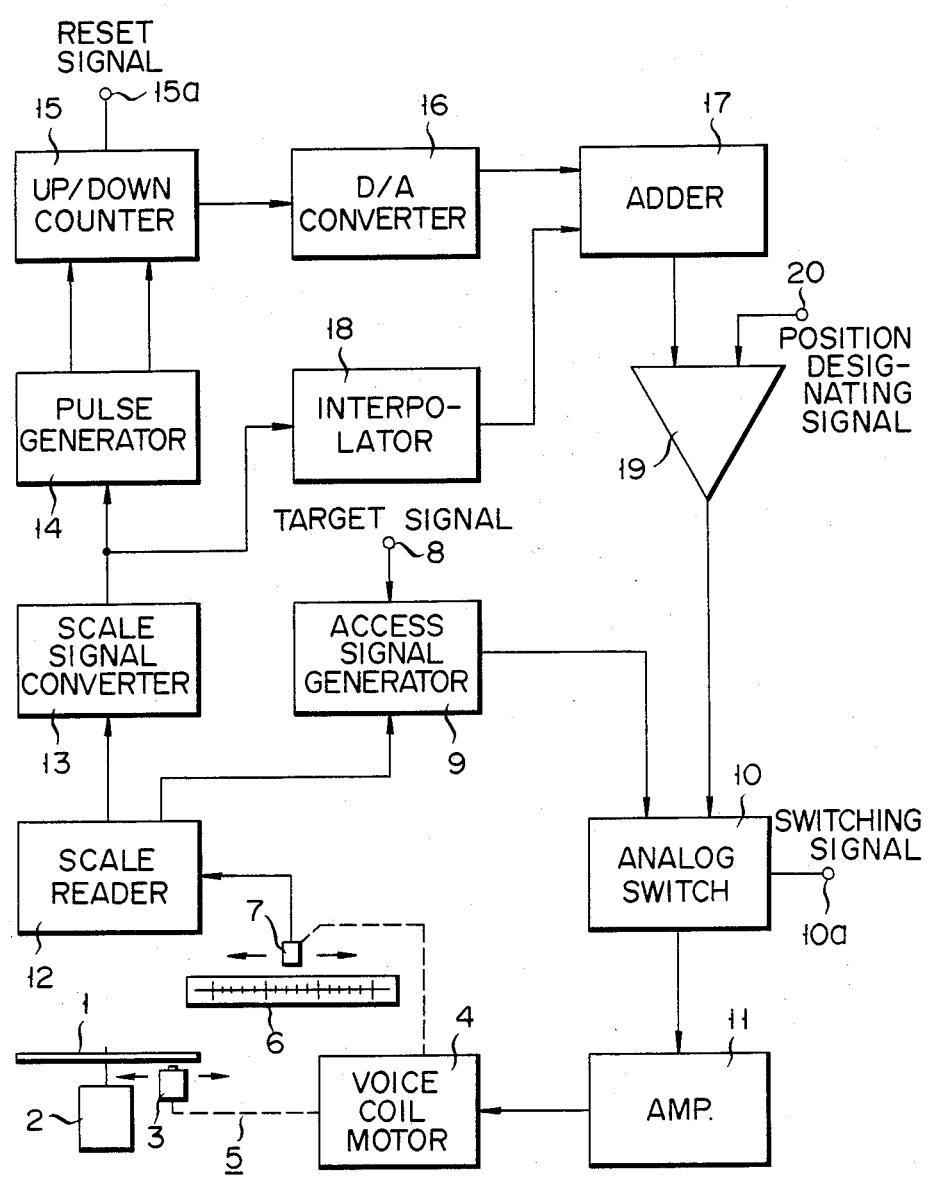
FIG. 1 is a block diagram of a head drive control apparatus according to an embodiment of the present invention.

The present invention will be described in detail with reference to FIGS. 1 and 2, in which FIG. 1 shows an embodiment of the present invention and FIGS. 2A to 2G show waveforms of signals for explaining the operation thereof.

Referring to FIG. 1, a disk 1 is driven by a spindle motor 2 at a constant speed. An optical head 3 optically performs write/read access of data with respect to the disk 1. The head 3 can be moved by a head drive mechanism 5 along the radial direction (indicated by arrows) of the disk 1. The head drive mechanism 5 has an actuator such as voice coil motor 4. A scale 6 is provided on the head drive mechanism 5. Marks on the scale 6 are detected by a photosensor 7 which is moved with the head by the voice coil motor 4.

When a target value signal is supplied to a terminal 8, an access signal is generated from an access signal generator 9. The access signal is supplied to a power amplifier 11 through an analog switch 10 which is initially switched to a speed control mode position. The power amplifier 11 amplifies the access signal, and an amplified signal is supplied to the voice coil motor 4 in the head drive mechanism 5. As a result, the voice coil motor 4 is controlled in response to the signal supplied from the power amplifier 11 and drives the optical head 3 along the radial direction of the disk 1. Movement of the head 3 is detected such that the photosensor 7 reads marks on the scale 6. A signal from the photosensor 7 is converted by a scale reader 12 to a scale signal. The scale signal is fed back to the access signal generator 9. The access signal generator 9 compares the fed-back scale signal with the target signal and continuously generates the access signal until a difference between the scale signal and the target signal becomes zero.

When the difference between the scale signal and the target signal becomes zero, the access signal is disabled, and at the same time the analog switch 10 is switched from the speed control mode position to a position control mode position in response to a switching signal supplied from a terminal 10a. In addition, a reset signal is supplied to a reset terminal 15a of an up/down counter 15 to be described later. Therefore, the count of the counter 15 becomes zero.

On the other hand, two 90°-phase shifted scale signals shown in FIGS. 2A and 2B are supplied from the scale reader 12 to a scale signal converter 13. The scale signal converter 13 converts the signals shown in FIGS. 2A and 2B to a saw-tooth wave signal shown in FIG. 2C in accordance with the phase difference between them (i.e., in accordance with the head moving direction component). The saw-tooth wave signal is supplied to a direction discrimination pulse generator 14 and an interpolator 18. The direction discrimination pulse generator 14 generates a pulse train shown in FIG. 2D in accordance with the saw-tooth wave signal. The pulse train is selectively supplied to the count-up input terminal or count-down input terminal of the up/down counter 15. The up/down counter 15 is reset at time T0 in FIG. 2G when the speed control mode is switched to the position control mode. Therefore, the up/down counter 15 then counts the subsequent pulses of the pulse train. The count of the up/down counter 15 is converted by a D/A converter 16 to a step-up signal shown in FIG. 2E. This step-up signal is supplied to one input terminal of an adder 17. The other input terminal of the adder 17 receives an output generated from the interpolator 18. The interpolator 18 generates a saw-tooth wave signal shown in FIG. 2F in accordance with the signal (FIG. 2C) generated from the scale signal converter 13.

The adder 17 generates an output having linearity as shown in FIG. 2G. The signal from the adder 17 is supplied to one input terminal of a differential amplifier 19. The other input terminal of the differential amplifier 19 receives a position designating signal as a servo input supplied from a terminal 20. Therefore, the differential amplifier 19 generates an output corresponding to a difference between the position designating signal and the output which is generated from the adder 17 and which represents the position of the head 3. The output from the differential amplifier 19 is supplied to the power amplifier 11 through the analog switch 10. The power amplifier 11 supplies the position control signal to the voice coil motor 4, thereby performing position control of the head 3. In this case, the servo range is wide and has a center at time T0 of FIG. 2G. In this manner, the servo range is independent of the scale pitch (corresponding to a half cycle of the scale signal in FIG. 2A or 2B).

According to the present invention as described above, there is provided a means for receiving an analog signal corresponding to the head position, which is obtained by processing the scale signal, for comparing the analog signal with the position designating signal to obtain a difference signal, and for controlling the head driver in response to the difference signal, thereby widening the servo range irrespective of the scale pitch. Therefore, a head drive control apparatus can be obtained wherein the servo range can be widened without degrading the precision of the head position.

What is claimed is:

1. A head drive control apparatus, comprising:
   a head for recording/reproducing data with respect to a disk-shaped recording medium;
   a head drive mechanism including a scale having marks at a predetermined pitch, for moving said head along a radial direction of said recording medium;
   scale signal detecting means for producing a periodically changing scale signal by reading the marks on said scale provided on said head drive mechanism, the scale signal representing a position of said head while moved by said head drive mechanism; and
   position controlling means for driving said head drive mechanism to control the position of said head according to a supplied position designation signal, said position controlling means comprising analog signal generating means for processing the scale signal to generate a linearly changing analog signal corresponding to a moved position of said head, and comparing means for comparing the analog signal generated from said analog signal generating means with the position designation signal to generate a difference signal, said head being driven by the head drive mechanism in accordance with the difference signal generated from said comparing means.

2. A head drive control apparatus according to claim 1, wherein said scale signal detecting means includes means for producing the scale signal in the form of two periodically changing signals which have different phases so that head moving direction information can be determined.

3. A head drive control apparatus according to claim 1, including speed controlling means coupled to said scale detecting means for comparing said scale signal with a supplied target signal, and for driving said head drive mechanism to perform speed control of said head until a difference between said scale signal and the target signal becomes zero.

4. A head drive control apparatus according to claim 1, wherein said analog signal generating means comprises a counter for counting said periodically changing scale signal, and means for outputting an analog signal in proportion to a value counted by said counter.

5. A head drive control apparatus according to claim 4, wherein said counter is an up/down counter and said analog signal generating means comprises a D/A converter for converting an output of said up/down counter to an analog signal, and an adder for adding an output of said D/A converter and an interpolation signal.

6. A head drive control apparatus according to claim 5, wherein said interpolation signal comprises said scale signal.

* * * * *